United States Patent [19]

Lewis

[11] Patent Number: 5,635,997
[45] Date of Patent: Jun. 3, 1997

[54] COLOUR DISPLAY DEVICE

[75] Inventor: Meirion F. Lewis, Malvern, United Kingdom

[73] Assignee: The Secretary of State for Defence in Her Britannic Majesty's Government of the United Kingdom of Great Britain and Northern Ireland, England

[21] Appl. No.: 367,256

[22] PCT Filed: Jun. 16, 1993

[86] PCT No.: PCT/GB93/01290

§ 371 Date: Jan. 6, 1995

§ 102(e) Date: Jan. 6, 1995

[87] PCT Pub. No.: WO94/01973

PCT Pub. Date: Jan. 20, 1994

[30] Foreign Application Priority Data

Jul. 9, 1992 [GB] United Kingdom ............ 9214558

[51] Int. Cl.⁶ .............. H04N 9/12; H04N 9/31; H04N 5/74

[52] U.S. Cl. .............. 348/742; 348/761; 348/760; 353/31; 353/34

[58] Field of Search ............ 348/742, 743, 348/740, 744, 750, 751, 752, 756, 757, 758, 759, 760, 761, 762, 766, 767; 359/40, 41, 49, 48; 353/31, 34; H04N 9/12, 9/30, 9/31, 5/74

[56] References Cited

U.S. PATENT DOCUMENTS

| | | | |
|---|---|---|---|
| H1320 | 6/1994 | Kieranski | 348/751 |
| 2,528,510 | 11/1950 | Goldmark | 348/743 |
| 2,990,449 | 6/1961 | Valensi | 348/752 |
| 3,383,460 | 5/1968 | Pritchard | 348/756 |
| 4,090,219 | 5/1978 | Ernstoff et al. | 348/742 |
| 4,907,862 | 3/1990 | Suntola | 348/743 |
| 5,172,221 | 12/1992 | Ko | 348/742 |
| 5,264,880 | 11/1993 | Sprague et al. | 353/31 |
| 5,398,081 | 3/1995 | Jones | 348/742 |

FOREIGN PATENT DOCUMENTS

| | | | |
|---|---|---|---|
| 0301715 | 2/1989 | European Pat. Off. | H04N 9/30 |
| 0108892 | 5/1991 | Japan | H04N 9/31 |
| 0236696 | 10/1991 | Japan | H04N 9/31 |
| 8202635 | 8/1982 | WIPO | H04N 1/46 |
| 9005429 | 5/1990 | WIPO | H04N 9/31 |

Primary Examiner—Michael H. Lee
Attorney, Agent, or Firm—Nixon & Vanderhye P.C.

[57] ABSTRACT

A color display device (10) incorporates three light sources (12) supplying red, green and blue light respectively. A spatial light modulator (20) is positioned to provide time varying selective blocking of light from the sources (12) under television signal control. Light passes from the sources (12) to a condenser lens (16), then through a liquid crystal display element (22) and a projection lens (18) before reaching a screen (30). The display element (22) is also under television signal control. Signals supplied to the display element (22) provide for successive sets of three frames to be displayed, each set incorporating frame information to be displayed as red, green and blue and combinable to form a colored frame. When the element (22) displays a frame corresponding to one of the three colors red, green and blue, the modulator (20) transmits that color and blocks the others. The screen (30) receives a color image in which red, green and blue are displayed successively for each frame.

10 Claims, 2 Drawing Sheets

--- BLUE LIGHT
—— RED LIGHT

COLOUR DISPLAY DEVICE

BACKGROUND OF THE INVENTION

1. Field of the Invention

This invention relates to a colour display device.

2. Discussion of Prior Art

Colour display devices such as colour television and colour projection apparatus are well known. One variety of colour television involves a thermionic vacuum tube containing a phosphor pixel screen. The screen has three phosphor dots in respective primary colours at each pixel. Three electron guns are employed, each addressing a respective primary colour dot at each pixel. This arrangement is complex, bulky and expensive. Colour projection apparatus typically employs a collared slide projected on to a screen with illumination by a white light source. This does not land itself to the projection of television signals, since such slides are only suitable for still images.

Liquid crystal displays are known for the production of television pictures, but there is difficulty in producing sufficiently large displays of the required quality. To obtain a large area picture, it is known to employ three liquid crystal displays each illuminated by a respective primary colour. Light from each display is projected on to a screen at which the primary colours are superimposed to yield a colour image. This is optically complex, as it requires three optical sections with accurate mutual alignment.

Colour display systems incorporating liquid crystal light valves or spatial light modulators are also known. International Patent Application No. PCT/US88/00142 published as No. WO88/06391 relates to one such system. It includes a white light source and an array of dichroic mirrors to define separate red, green and blue light beams. The beams pass through respective polarizers referred to as optical switches; the latter are arranged to provide either polarization rotation or no such rotation according to an electrical signal input effecting an "off" or "on" state. The beams are subsequently recombined to form a single beam and pass to a polarization analyser. The analyser reflects light with rotated polarization to a light valve and transmits light having unchanged polarization. The red, green and blue beams undergo rotation of polarization successively, so that at any one time the light valve receives light of one of the three colours. A cathode ray tube illuminates the light valve to form an image therein, and the image reflects the incident red, green or blue light to a projection screen or the like. This system is undesirably complex. It requires five polarization selective devices and three colour selective (dichroic) mirrors.

European Patent Application No. 0301 715 A1 relates to a display system in which a display matrix is illuminated by beams of different collared light from a light source. The light source may comprise a single filtered white light source, or a plurality of collared sources. Liquid crystal shutters are arranged adjacent the light source and are switchable between a light blocking mode and a light transmitting mode to allow a single collared light beam to illuminate the display matrix. As the liquid crystal shutters are adjacent to the light source they may be affected by heating up the source. Additionally, the embodiment employing the white light source has an efficiency of only ⅑ or 11%. This is because only one-third of the light incident on the shutters is utilised and only one-third of the light utilised is allowed through the shutters.

The published International Application Number WO 90/05429 also relates to a display system in which a display is illuminated by a white light source via liquid crystal shutters with red, green and blue filters to provide a single collared illumination beam. This device also has a display efficiency of only 11%.

SUMMARY OF THE INVENTION

It is an object of the invention to provide an alternative form of display device.

The present invention provides a colour display device comprising (a) a display element arranged to provide successive sets of frames of information for optical read-out, the frame sets each corresponding to a common set of wavelength intervals and being combinable to form a colour image;

(b) light generating means arranged to illuminate the display element with light of the said wavelength intervals to provide optical read-out, the generating means providing for the wavelength intervals to be or become spatially dispersed;

(c) spatial light modulating means located at a position where there appear real images of a light source or light sources incorporated in the light generating means, wherein the spatial light modulating means is arranged to receive spatially dispersed light and to provide time dependent selection of wavelength intervals appropriate to concurrently displayed frames.

The invention provides the advantage that it is a colour display device of simple construction requiring only one display element for all wavelength intervals or primary colours. Because the spatial light modulating means receives spatially dispersed light, it is possible to accept the required wavelength interval and reject others without requiring polarizing devices or dichroic elements as in the prior art.

The modulating means is located at a position where there appear real images of a light source or light sources incorporated in the light generating means. Consequently the modulating means is not affected by any heating of the light source.

The light generating means may incorporate a white light source and dispersing means arranged to disperse light from that source and located in a light path between that source and the real images thereof.

The invention may include a projection lens arranged to project an image of the display element upon receiving means, and the light generating means may include a condenser lens system arranged to illuminate the display element and to provide convergent light from at least one source and directed generally towards the projection lens. The condenser lens system may comprise two condenser lenses. The light source may be a white light source, the generating means may include dispersing means arranged to disperse light from the source to provide the said wavelength intervals, and the modulating means may be located at a position where real images of the source are produced by the condenser lens system in respective wavelength intervals.

BRIEF DESCRIPTION OF THE DRAWINGS

In order that the invention might be more fully understood, embodiments thereof will now be described, by way of example only, with reference to the accompanying drawings, in which.

DETAILED DISCUSSION OF PREFERRED EMBODIMENTS

Figure 1:
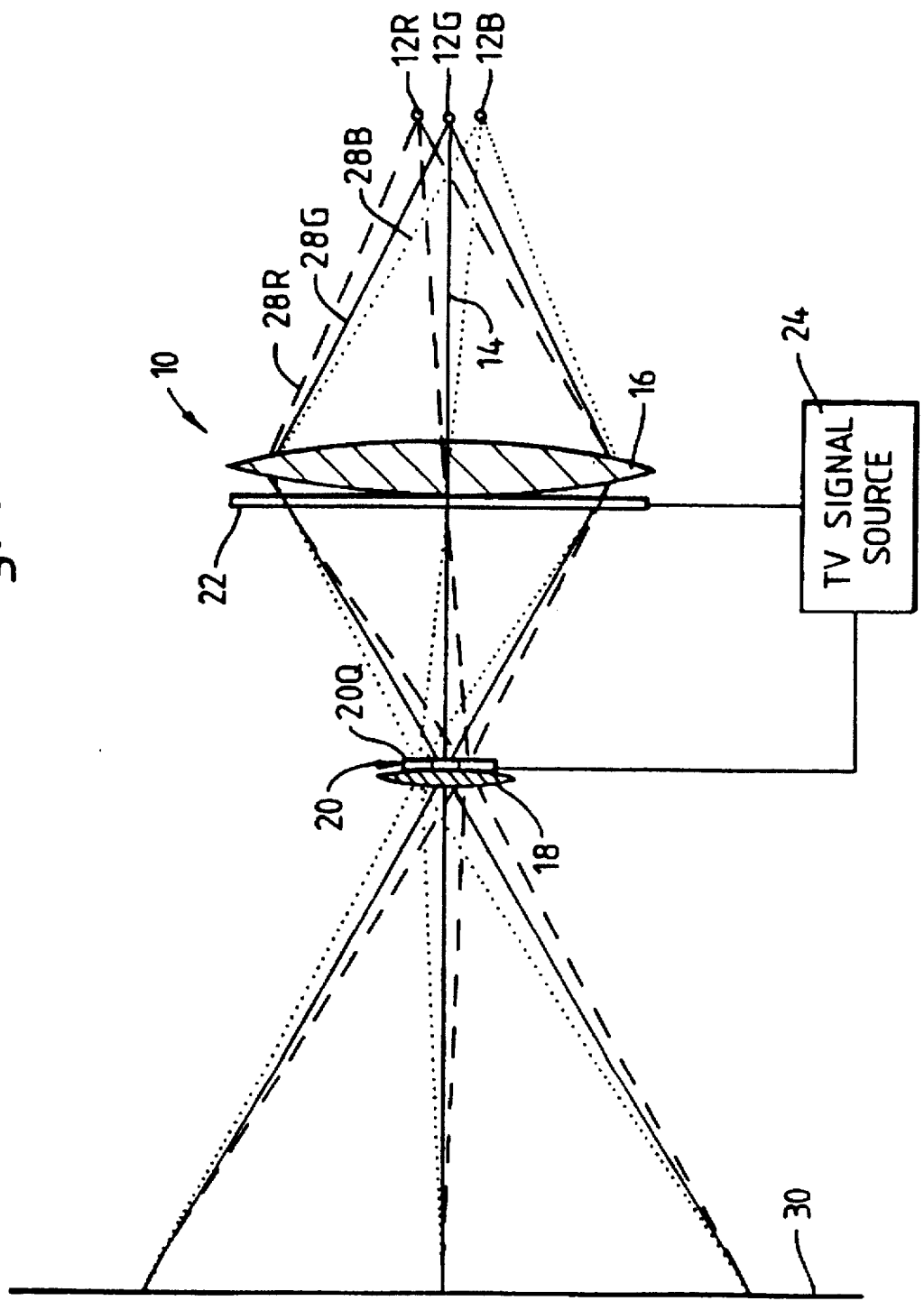
FIG. 1 is a schematic plan view of a colour display device of the invention.

Referring to FIG. 1, there is shown a colour display device of the invention indicated generally by 10. The device 10 incorporates three light sources 12R, 12G and 12B (collectively referred to as the "sources 12"), which provide red, green and blue light respectively. The green source 12G is located on an axis 14, which is the optical axis of a condenser lens 16 and a projection lens 18. The red and blue sources 12R and 12B are equidistant from and on opposite sides of the green source 12G, and the sources 12 are arranged in a plane extending perpendicular to the axis 14.

The device 10 also incorporates an electrically controlled, liquid crystal spatial light modulator 20, located at position 20Q. The location 20Q is in an image plane of the sources 12 formed by the lens 16. This image plane is in the vicinity of (but need not be contiguous with) the projection lens 18.

A transmissive element 22 to be imaged by the device 10 is located adjacent the condenser lens 16. The element 22 is a liquid crystal display bearing pictorial information in a television format, the display being suitable for optical read-out by an incident light beam.

The device 10 operates as follows. A television signal is supplied by a source 24 to the transmissive element or display 22. The signal is constructed of successive signal frame sets, each set incorporating three successive frames of information. Each frame set incorporates the image information required to produce one collared image. Each of the three frames of information in a set corresponds to a respective primary colour, red, green or blue. In synchronism with the television signal, a drive signal is supplied by the TV signal source 24 to the modulator 20. The modulator 20 has three sections (not shown) each of which may be optically opaque or transparent as controlled by the drive signal. The drive signal controls the optical states of the modulator sections so that the red, green and blue sources 12R, 12G and 12B supply light to the display 22 one at a time and in succession; is when one modulator section is transmissive the other two are opaque, and the drive signal switches the sections from opaque to transmissive in succession. The modulator 20 therefore acts as a fast, positionally movable shutter.

Red, green and blue light passes to and beyond the display 22 as indicated by chain, solid and dotted lines 28R, 28G and 28B respectively. The condenser lens 16 forms real images of the sources 12 at the location 20Q. The projection lens 18 forms a real image of the display 22 upon a screen 30. Any light ray leaving the display 22 and passing through the projection lens 18 contributes to the image of the display formed on the screen 30. In consequence, the directions from which the display 32 is illuminated are not critical, and consequently nor is the collective size of the sources 12, provided it is not too large. For the same reason, the distance of the projection lens 18 from the condenser lens 16 need not be particularly accurate; this accuracy only affects light collection efficiency. However, it is important that a modulator 20 is located in an image plane of the sources 12 produced by the lens 16. It is also important that the relative positioning of the display 22, projection lens 18 and screen 30 satisfy the well-known lens equation:

$$\frac{1}{w} + \frac{1}{v} = \frac{1}{f}$$

where
u=object distance between the projection lens 18 and display 22;
v=image distance between the projection lens 18 and the screen 30; and
f=the projection lens focal length.

The projection lens 18 is positionally adjustable to ensure that a well-focused image of the display 22 appears on the screen 30.

The signals output from the TV signal source 24 are synchronised so that each frame of information corresponding to red light in a collared image reaches the display 22 at the same time as the modulator 20 transmits red light 28R but blocks green and blue light 28G and 28B. Similarly, green light 28G or blue light 28B is transmitted by the modulator 20 (with blockage of the other two colours in each case) at times when the display 22 bears forms of information for illumination in green light or blue light respectively. The TV signal therefore consists of sets of frames in which each set contains a red frame, a blue frame and a green frame in sequence. Each frame becomes displayed on the screen 30 in succession in light of the appropriate colour in each case.

The display 22 receives light of all three colours simultaneously, but the modulator 20 blocks light from two of the three real collared images of the sources 12 at 20Q. In consequence, only one of the three colours at a time reaches the screen 30.

Figure 2:
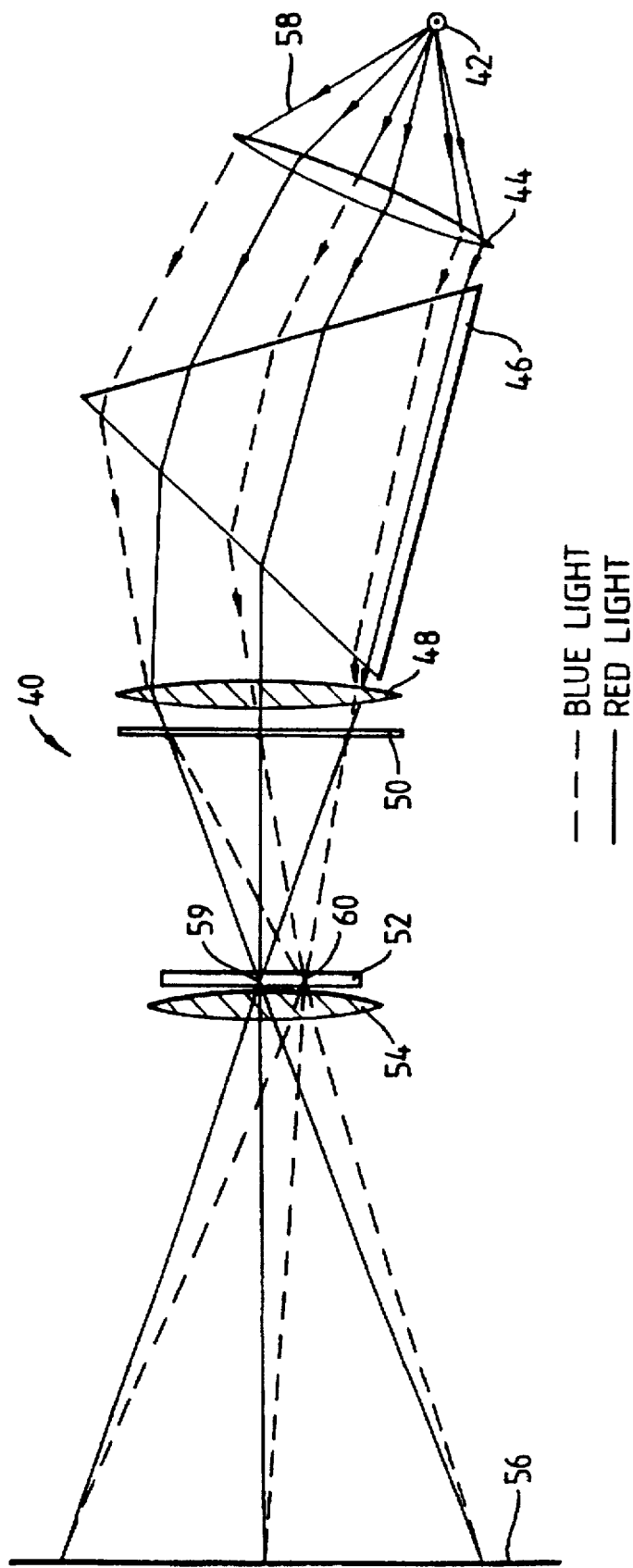
FIG. 2 is a schematic plan view of an alternative form of colour display device of the invention.

Referring now to FIG. 2, there is shown an alternative embodiment of the invention in the form of a device indicated generally by 40. The device 40 incorporates a white light source 42, which is located in the focal plane of a first condenser lens 44. Light from the lens 44 passes through a high dispersion prism 46 to a second condenser lens 48, and thence to a transmissive liquid crystal display 50. Light transmitted by the display 50 passes through a spatial light modulator 52 and a projection lens 54, the modulator 52 being located in the focal plane of the second condenser lens 48. A screen 56 receives light from the projection lens 54. It is positioned relative to the lens 54 and display 50 in accordance with Equation (1). A television signal source (not shown) supplies successive sets of frame signals to the display 50, and also supplies a drive signal to the modulator 52.

The device 40 operates as follows. White light from the source 42, indicated by divergent rays such as 58, is rendered substantially parallel by the first condenser lens 44. The light 58 is dispersed by the prism 46, red and blue rays being indicated by solid and chain lines respectively. Dispersed collared images of the source 42 are produced in the focal plans of the second condenser lens 48, red and blue images being indicated by crossings 59 and 60 of solid and chain lines respectively. These images are superimposed on the modulator 52, which has sections (not shown) disposed to block or transmit red, green and blue light images respectively. The dispersion introduced by the prism 46 is sufficiently large to ensure that the red, green and blue images of the source 42 do not overlap one another to a significant extent.

For a source 42 in the form of a filament lamp with an elongate filament, the dispersed dimension of the filament image is the filament width or transverse dimension. In consequence, the red, green and blue images of the filament have substantially parallel longitudinal dimensions which are transversely displaced from one another. This provides two benefits. It allows the use of projection lens 54 which is smaller than would otherwise be the case, and it reduces colour image overlap.

The optical transmissions of the display 50 and modulator 52 are controlled by a television signal source (not shown) as described in relation to FIG. 1. In consequence, successive single colour frames appear on the screen as the modulator 52 transmits red, green and blue wavelength intervals in sequence, and the display 50 bears successive single colour frames. The device 40 is therefore equivalent to the device 10 of FIG. 1 with the substitution of a white light source 42 and a dispersive element 46 for discrete collared light sources 12.

The device 40 may be modified by replacing the prism 46 by a diffraction grating blazed in an order appropriate to produce adequate dispersion at the position of the modulator 52. The flat screen 56 may be replaced by a curved screen in a wide-angle device.

The devices 10 and 40 need not be employed with the three colours red, green and blue. It is necessary to employ a plurality of wavelength intervals giving a reasonable degree of coverage of the visible spectrum (400–700 nm) in order to produce adequate colour images. Whichever intervals are selected, each television frame must bear image details appropriate to the associated wavelength interval illuminating it. The devices 10 and 40 may be adjustable for colour control by providing for the dwell time at different wavelength intervals to be variable.

There is also an alternative approach to colour control; this involves a spatially variable interval produced by the modulator 52, instead of the temporal equivalent previously described. In this alternative, the modulator 52 is controllable to vary the size of one or more transparent illuminated regions through which light reaches the screen 56. This has a further potential benefit when used in conjunction with a typical commercial light source 42 of finite size. Such a source gives rise to a degree of overlap of differently collared images at the modulator 52. The overlap regions may be reduced or eliminated by the modulator 52 with spatial interval variation as described above.

The light usage efficiency of the devices 10 and 40 may be improved by employing a concave mirror or mirrors to reflect into the first condenser lens 44 light leaving the light source 42 to the right in FIG. 2. The displays 22 and 50 may be reflection mode devices instead of being transmissive, in which case the devices of the invention would have folded optical paths.

I claim:

1. A color display device comprising:
   (a) light generating means for illuminating a display element with light of a common set of wavelength intervals, said light generating means including at least one light source and means for forming a real image for each wavelength interval of said common set of wavelength intervals, at least one of said real images spatially dispersed with respect to at least another of said real images;
   (b) wherein said display element provides successive sets of frames of information for optical read-out, the frame sets each corresponding to said common set of wavelength intervals and being combinable to form a color image; and
   (c) spatial light modulating means, located at a position where said light generating means forms said real images of said at least one light source, said spatial light modulation means is responsive to said spatially dispersed light, said display element and said common set of wavelength intervals, said spatial light modulating means for providing a time dependent selection of said wavelength intervals appropriate to said successive sets of frames.

2. A device according to claim 1 wherein the light generating means incorporates a white light source and dispersing means dispersing light from that source and located in a light path between that source and the real images thereof.

3. A device according to claim 1 including a projection lens for projecting an image of the display element upon receiving means, and wherein the light generating means includes a condenser lens system for illuminating the display element and for providing convergent light from said at least one light source and directed generally towards the projection lens.

4. A device according to claim 3 wherein the condenser lens system comprises two condenser lenses.

5. A device according to claim 4 wherein said at least one light source is a white light source, the light generating means includes dispersing means for dispersing light from said white light source to provide said wavelength intervals, and the spatial light modulating means is located at a position where real images of said white light source are produced by the condenser lens system in said respective wavelength intervals.

6. A color display device according to claim 1, wherein said light generating means includes a plurality of lights, at least two of said lights having different wavelength intervals and said display element is at least partially illuminated by spatially dispersed light from said plurality of lights.

7. A color display device according to claim 1, wherein said at least one light source is a source of white light and said light generating means includes a means for spatially dispersing said white light into a set of common wavelengths.

8. A color display device according to claim 1, wherein said spatial light modulating means passes a time dependent selection of said wavelength intervals appropriate to said successive sets of frames.

9. A color display device comprising:
   (a) light generating means for illuminating a display element with light of a common set of wavelength intervals, said light generating means including at least one light source and means for forming a real image for each wavelength interval of said common set of wavelength intervals, at least one of said real images spatially dispersed with respect to at least another of said real images;
   (b) wherein said display element provides successive sets of frames of information for optical read-out, the frame sets each corresponding to said common set of wavelength intervals and being combinable to form a color image; and
   (c) spatial light modulating means, located at a position where said light generating means forms said real images of said at least one light source and synchronized with said display element, for passing successive frames of a time dependent selection of said wavelength intervals from said display element.

10. A color display device comprising:
    (a) a white light source for illuminating a display element with light of a common set of wavelength intervals, said display element located at least partially within a path of light from said white light source;
    (b) a prism and lens combination, located within the path of light, for forming a real image for each wavelength interval of said common set of wavelength intervals, at least one of said real images spatially dispersed with respect to at least another of said real images;

(c) a display element for providing successive sets of frames of information for optical read-out, the frame sets each corresponding to said common set of wavelength intervals and being combinable to form a color image; and (d) a spatial light modulator, located at a position where said prism and lens combination forms said real images of said white light source and responsive to light from said display element, for providing a time dependent selection of said wavelength intervals appropriate to said successive sets of frames.

* * * * *

UNITED STATES PATENT AND TRADEMARK OFFICE
CERTIFICATE OF CORRECTION

PATENT NO. : 5,635,997
DATED : June 3, 1997
INVENTOR(S) : Lewis

It is certified that error appears in the above-indentified patent and that said Letters Patent is hereby corrected as shown below:

Column 1, line 16 "collared" should be --coloured--.

Column 1, line 18 "land" should be --lend--.

Column 1, line 53 "collared" should be --coloured--.

Column 1, line 55 "collared" should be --coloured--.

Column 1, line 58 "collared" should be --coloured--.

Column 4, line 9 "collared" should be --coloured--.

Column 4, line 22 "collared" should be --coloured--.

Column 4, line 46 "collared" should be --coloured--.

Column 5, line 7 collared" should be --coloured--.

Signed and Sealed this

Twenty-sixth Day of August, 1997

*Attest:*

BRUCE LEHMAN

*Attesting Officer*     *Commissioner of Patents and Trademarks*